(12) United States Patent
Yamauchi

(10) Patent No.: US 11,761,487 B2
(45) Date of Patent: *Sep. 19, 2023

(54) SLIDING MEMBER

(71) Applicant: DAIDO METAL COMPANY LTD., Nagoya (JP)

(72) Inventor: Takayoshi Yamauchi, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 789 days.

This patent is subject to a terminal disclaimer.

(21) Appl. No.: 16/828,659

(22) Filed: Mar. 24, 2020

(65) Prior Publication Data

US 2020/0309194 A1 Oct. 1, 2020

(30) Foreign Application Priority Data

Mar. 28, 2019 (JP) ................................. 2019-062128

(51) Int. Cl.
| | | |
|---|---|---|
| *C08K 7/02* | (2006.01) | |
| *F16C 17/02* | (2006.01) | |
| *F16C 17/06* | (2006.01) | |
| *F16C 33/04* | (2006.01) | |
| *F16C 33/12* | (2006.01) | |
| *A01J 5/007* | (2006.01) | |
| *B32B 15/098* | (2006.01) | |
| *B32B 15/088* | (2006.01) | |
| *B32B 15/085* | (2006.01) | |
| *B32B 15/092* | (2006.01) | |

(52) U.S. Cl.
CPC ............. *F16C 33/122* (2013.01); *A01J 5/007* (2013.01); *C08K 7/02* (2013.01); *F16C 17/02* (2013.01); *B32B 15/085* (2013.01); *B32B 15/088* (2013.01); *B32B 15/092* (2013.01); *B32B 15/098* (2013.01); *C08K 2201/004* (2013.01); *C08K 2201/016* (2013.01); *F16C 2208/02* (2013.01); *F16C 2208/04* (2013.01); *F16C 2208/36* (2013.01); *F16C 2240/48* (2013.01)

(58) Field of Classification Search
None
See application file for complete search history.

(56) References Cited

U.S. PATENT DOCUMENTS

| | | | | |
|---|---|---|---|---|
| 10,458,471 | B2 * | 10/2019 | Yamauchi | ............... F16C 17/00 |
| 10,794,426 | B2 * | 10/2020 | Yamauchi | ............. F16C 33/125 |
| 11,199,223 | B2 * | 12/2021 | Yamauchi | ............. F16C 33/122 |
| 11,236,780 | B2 * | 2/2022 | Ito | ........... F16C 33/201 |
| 2018/0258990 | A1 * | 9/2018 | Yamauchi | ............. F16C 33/125 |
| 2018/0258992 | A1 * | 9/2018 | Yamauchi | ............. F16C 33/203 |

FOREIGN PATENT DOCUMENTS

| | | |
|---|---|---|
| JP | H10204282 A | 8/1998 |
| JP | 2013194204 A | 9/2013 |
| JP | 201594373 A | 5/2015 |
| JP | 2016079391 A | 5/2016 |
| JP | 2018146059 A | 9/2018 |

* cited by examiner

*Primary Examiner* — Sheeba Ahmed
(74) *Attorney, Agent, or Firm* — Snyder, Clark, Lesch & Chung, LLP

(57) ABSTRACT

A sliding member for a thrust bearing is provided. A sliding layer includes fibrous particles dispersed in a synthetic resin, and has a sliding surface side region and an interface side region. The particles have an average particle size $D_{sur,\,first}$ and $D_{sur,\,second}$ respectively in first and second cross-sections in the sliding surface side region, and $D_{int,\,first}$ and $D_{int,\,second}$ respectively in first and second cross-sections in the interface side region. $D_{sur,\,first}$ and $D_{int,\,second}$ are 5-30 μm, and $D_{sur,\,second}$ and $D_{int,\,first}$ are 5 to 20% of respectively $D_{sur,\,first}$ and $D_{int,\,second}$. A dispersion index of the particles having the major axis length of 20 μm or longer is 5 or more, both in the sliding surface side region in view of the first cross-section and in the interface side region in view of the second cross-section.

12 Claims, 6 Drawing Sheets

SLIDING MEMBER

FIELD OF THE INVENTION

The present invention generally relates to a sliding member for a thrust bearing. Specifically, it relates to a sliding member having a partial annular shape and including a back-metal layer, and a sliding layer including synthetic resin and fibrous particles. The present invention further relates to a thrust bearing including the sliding member.

DESCRIPTION OF RELATED ART

A thrust bearing has been used for a rotation shaft of an exhaust turbine, a large-scale electrical generator or other devices. Such thrust bearing includes a plurality of sliding members each having a partially annular bearing pad shape and the sliding members are arranged along a circumferential direction and facing a thrust collar surface of the rotation shaft. (see e.g. JP 2015-94373A). In such a tilting pad type thrust bearing, each of the sliding members having the partially annular shape is supported by a pivot in such a manner as to be slightly oscillatable with respect to the thrust collar surface of the shaft member. As the sliding member for the thrust bearing, a sliding member including a resin sliding layer coated on a back metal layer has been known. JP 10-204282A and JP 2016-079391A disclose a resin composition including fibrous particles, such as glass fibrous particles, carbon fibrous particles or intermetallic compound fibrous particles, dispersed in the synthetic resin to increase strength of the sliding layer. JP 2013-194204A discloses to disperse fibrous particles in a resin matrix in a non-oriented or isotropic manner, to prevent the fiber-reinforced resin composition from having anisotropy of strength. In JP 2018-146059A, fibrous particles are dispersed so as to orient substantially parallel to the sliding layer in a surface side region and an interface side region of the sliding layer while the particles in an intermediate region of the sliding layer are oriented substantially perpendicular to the sliding layer, thereby preventing damages such as cracks on a surface of the sliding layer when a bearing device starts its operation.

BRIEF SUMMARY OF THE INVENTION

During steady operation of an exhaust turbine, a large-scale electrical generator or other devices, a fluid lubricating film, such as oil film, is formed between a surface of a shaft member and a sliding surface of a sliding member, thereby a direct contact between the shaft member and the sliding member is prevented. However, in the stopping time period thereof, supply of such as oil is stopped, and thus the shaft continues to rotate for a certain time without the supply of the fluid lubricating film of oil or the like before the rotation is completely stopped. Accordingly, the shaft member slides against the sliding surface of the sliding member while the shaft member is in direct contact with the sliding surface of the sliding member. When the shaft member slides against the sliding surface of the sliding member in this way, a resin composition near the sliding surface in contact with the shaft member is drawn by the shaft member and elastically deformed in a rotation direction of the shaft member. In this case, if fibrous particles are dispersed in the sliding layer in a non-oriented manner, i.e., in an isotropic manner as in JP 2013-194204A, the resin composition in the vicinity of the sliding surface is largely deformed. Thus, damages such as cracks are more likely to occur inside of the sliding layer. The same applies when the fibrous particles are dispersed in the sliding layer such that more fibrous particles have major axes oriented perpendicular to the sliding surface. On the other hand, when the fibrous particles are dispersed in the sliding layer such that the more fibrous particles have major axes oriented substantially parallel to the sliding surface, the entire sliding layer has high strength in a direction parallel to the sliding surface, and thus a load applied to the surface of the sliding layer is transmitted to an interface between the sliding layer and the back-metal layer. When the load is transmitted to the interface, a shear force is generated and extends, leading to peeling off, since amount of elastic deformation is difference between the back-metal layer made of a metal and the sliding layer made of a synthetic resin. As stated in JP 2018-146059A, when the fibrous particles are dispersed in the sliding layer such that the fibrous particles in a surface side region and an interface side region of the sliding layer are oriented substantially parallel to the sliding layer and the fibrous particles in an intermediate region of the sliding layer are oriented substantially perpendicular to the sliding layer, another problem is caused that damages due to cracks in a longitudinal direction along the fibrous particles is more likely to occur in the intermediate region when the bearing device is in the stopping period. Due to a large load (since a shaft of the large bearing device has a large weight) applied to the sliding surface in direct contact with the shaft without the supply of the fluid lubricating film of oil or the like, excessive deformation occurs in the intermediate region of the sliding layer having a low deformation resistance against the load in a direction parallel to the sliding surface.

An object of the present invention is to overcome the above problems of the prior arts and provide a sliding member that is less likely suffer from damage due to cracks inside of a sliding layer and from shear between the sliding layer and the back metal layer when a bearing device is in the stopping period.

According to an aspect of the present invention, provided is a sliding member for a thrust bearing. The sliding member includes a back-metal layer and a sliding layer on the back-metal layer. The sliding member has a partial annular shape. The sliding layer includes synthetic resin, and fibrous particles dispersed in the synthetic resin at a volume ratio of 10 to 35% of the sliding layer. The sliding layer is composed of a sliding surface side region including a sliding surface of the sliding layer, and an interface side region including an interface between the sliding layer and the back-metal layer. A thickness of the interface side region is 15 to 50% of a thickness of the sliding layer (from the interface between the sliding layer and the back-metal layer toward the sliding surface). The sliding layer has a first cross section and a second cross section. The second cross section is perpendicular to the first cross section, and the first cross section and the second cross section are perpendicular to the sliding surface. The first cross-section and the second cross-section satisfy the following relationships (a) to (d):

(a) in the sliding surface side region, the fibrous particles in view of the first cross-section have an average particle size $D_{sur, first}$ of 5 to 30 μm, and the fibrous particles in view of the second cross-section have an average particle size $D_{sur, second}$. The average particle size $D_{sur, second}$ is 5 to 20% of the average particle size $D_{sur, first}$ of the fibrous particles in view of the first cross-section;

(b) in the interface side region, the fibrous particles in view of the second cross-section have an average particle size $D_{int, second}$ of 5 to 30 μm, and the fibrous particles in view of the first cross-section have an average particle size $D_{int, first}$.

The average particle size $D_{int, first}$ is 5 to 20% of the average particle size $D_{int, second}$ in view of the second cross-section;

(c) in the sliding surface side region in view of the first cross-section, the fibrous particles therein include fibrous particles having a length of a major axis of not shorter than 20 μm. A volume ratio of the fibrous particles having the major axis length of not shorter than 20 μm to a total volume of the fibrous particles in the sliding surface side region is not less than 10%, and a dispersion index of the fibrous particles having the major axis length of not shorter than 20 μm is not less than 5; and (d) in the interface side region in view of the second cross-section, the fibrous particles therein include fibrous particles having a length of major axis of not shorter than 20 μm. A volume ratio of the fibrous particles having the major axis length of not shorter than 20 μm to a total volume of the fibrous particles in the interface side region is not less than 10%, and a dispersion index of the fibrous particles having the major axis length of not shorter than 20 μm is not less than 5.

Here, X1 represents a length of a fibrous particle in a cross-section in a direction parallel to the sliding surface, and Y1 represents a length of a fibrous particle in the cross-section in a direction perpendicular to the sliding surface.

According to an embodiment of the present invention, the first cross section is parallel to a center axis of the partial annular shape of the sliding member According to an embodiment of the present invention, the second cross section is parallel to a center axis of the partial annular shape of the sliding member.

According to an embodiment of the present invention, in the sliding surface side region of the first cross-section, an average aspect ratio of the fibrous particles having the major axis length of not shorter than 20 μm is preferably 1.5 to 10, and more preferably 5 to 10. Furthermore, in the interface side region of the second cross-section, an average aspect ratio of the fibrous particles having the major axis length of not shorter than 20 μm having the major axis length of not shorter than 20 μm is preferably 1.5 to 10, and more preferably 5 to 10.

According to an embodiment of the present invention, in the sliding surface side region of the first cross-section, the volume ratio of the fibrous particles having the major axis length of not shorter than 20 μm to the total volume of the fibrous particles in the sliding surface side region is preferably not less than 30%. Furthermore, in the interface side region of the second cross-section, a volume ratio of the fibrous particles having the major axis length of not shorter than 20 μm to the total volume of the fibrous particles in the interface side region is preferably not less than 30%.

According to an embodiment of the present invention, the fibrous particles are preferably composed of one or more selected from glass fiber particles, ceramic fiber particles, carbon fiber particles, aramid fiber particles, acrylic fiber particles, and polyvinyl alcohol fiber particles.

According to an embodiment of the present invention, the synthetic resin is preferably composed of one or more selected from polyether ether ketone, polyether ketone, polyether sulfone, polyamidimide, polyimide, polybenzimidazole, nylon, phenol, epoxy, polyacetal, polyphenylene sulfide, polyethylene, and polyetherimide.

According to an embodiment of the present invention, the sliding layer preferably further includes one or more solid lubricants selected from graphite, molybdenum disulfide, tungsten disulfide, boron nitride, and polytetrafluoroethylene.

According to an embodiment of the present invention, the sliding layer preferably further includes 1 to 10 volume % of one or more fillers selected from $CaF_2$, $CaCo_3$, talc, mica, mullite, iron oxide, calcium phosphate, potassium titanate, and $Mo_2C$ (molybdenum carbide).

According to an embodiment of the present invention, the back-metal layer preferably includes a porous metal portion on a surface which is the interface between the back-metal layer and the sliding layer.

According to another aspect of the present invention, provided is a thrust bearing including a plurality of the above sliding members.

DETAILED DESCRIPTION OF THE INVENTION

Figure 8:
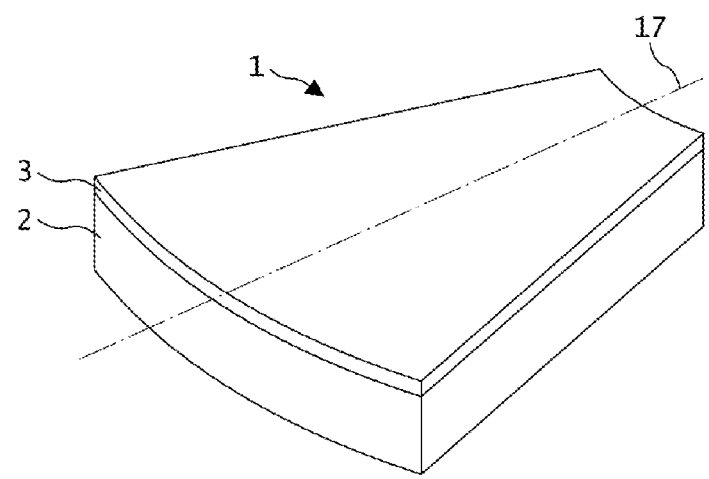
FIG. 8 is a schematic diagram of an example of the sliding member according to the present invention.

FIG. 8 schematically illustrates an embodiment of a sliding member 1 according to the present invention. The sliding member 1 is flat, and the flat surface has a partial annular shape, which corresponds to a part of an annulus having a shape obtained by cutting an annulus along two radii of the annulus. A center angle of the partial annular shape preferably ranges from 25° to 60°, although the center angle is not limited to this range. The sliding member 1 includes a back metal layer 2 having a partial annular flat-plate shape, and a sliding layer 3 on the back metal layer 2. The sliding layer 3 is composed of a synthetic resin 4 in which 10 to 35 volume % of fibrous particles 5 are dispersed.

Hereinafter, a surface of the sliding layer 3 is referred to as "sliding surface". Herein, the term "cross section" indicates a "cross section perpendicular to the sliding surface", unless otherwise specified.

A circumferential direction of an imaginary annulus forming the partial annular shape is hereinafter referred to as a "circumferential direction". A radial direction of the annulus is hereinafter referred to as a "radial direction". A radial imaginary line passing through the circumferential center of the partial annular shape (and passing through a center of a plate thickness of the sliding member 1) is referred to as a central axis 17.

Generally speaking, the sliding layer 3 is composed of a sliding surface side region 31 on a side including a sliding surface 30 and an interface side region 32 on a side including an interface 7 between the sliding layer 3 and the back-metal layer. Orientations of the fibrous particles 5 in the two regions differ from each other. In each region, there is an orientation in which major axes of the fibrous particles 5 therein are oriented as a whole (i.e., more fibrous particles 5 in the each region are oriented substantially parallel to the orientation direction). The orientation direction in the sliding surface side region 31 is referred to as "first direction", and the orientation direction in the interface side region 32 is referred to as "second direction". The first direction is substantially perpendicular to the second direction, and the first and second directions are both substantially parallel to the sliding surface 30. Cross sections along (or parallel to) the first direction and the second direction are referred to as "first cross section" and "second cross section", respectively. Observed structures of the first cross section and the second cross section are referred to as "first cross-sectional structure" and "second cross-sectional structure", respectively.

Figure 1:
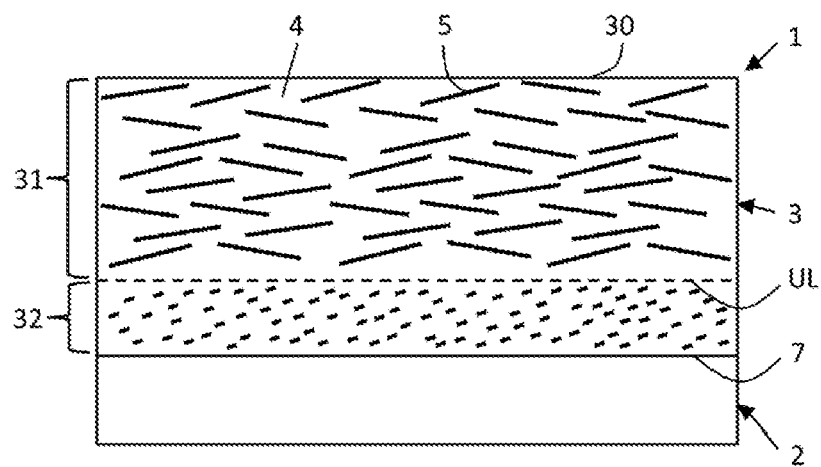
FIG. 1 shows a first cross section of a sliding member according to an embodiment of the present invention.
Figure 2:
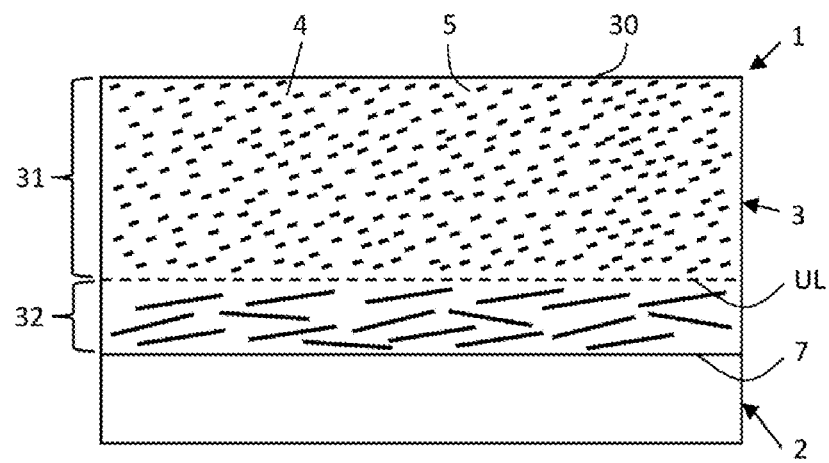
FIG. 2 shows a second cross section of a sliding member according to an embodiment of the present invention.

FIG. 1 schematically shows a first cross section of the sliding member 1 according to an embodiment of the present invention. FIG. 2 schematically shows a second cross section of the sliding member 1 according to an embodiment of the present invention.

Figure 1A:
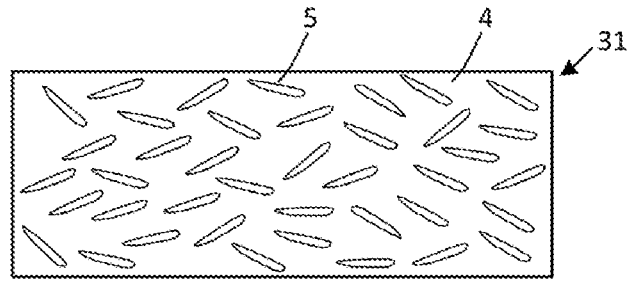
FIG. 1A is an enlarged view of a sliding layer side region of a sliding layer of the sliding member in FIG. 1.
Figure 1B:
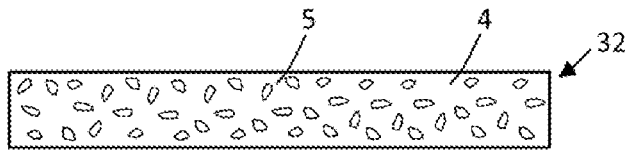
FIG. 1B is an enlarged view of an interface side region of the sliding layer of the sliding member in FIG. 1.
Figure 2A:
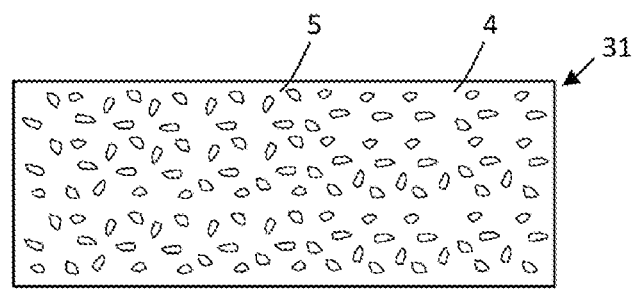
FIG. 2A is an enlarged view of a sliding layer side region of a sliding layer of the sliding member in FIG. 2.
Figure 2B:
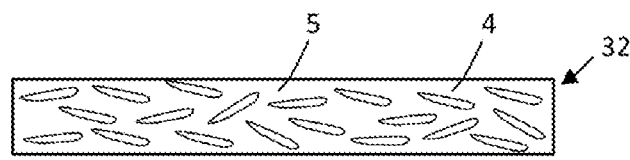
FIG. 2B is an enlarged view of an interface side region of the sliding layer of the sliding member in FIG. 2.

The sliding member 1 includes a sliding layer 3 on a back-metal layer 2. The sliding layer 3 includes 10 to 35 volume % of fibrous particles 5 dispersed in a synthetic resin 4. The sliding layer 3 is composed of a sliding surface side region 31 on a side including the sliding surface 30, and an interface side region 32 on a side including an interface 7 between the sliding layer 3 and the back-metal layer. A thickness of the interface side region 32 is 15 to 50% of a thickness of the sliding layer 3. In each region 31, 32, 10 to 35 volume % of fibrous particles 5 are preferably dispersed in the synthetic resin 4. More fibrous particles 5 in the sliding surface side region 31 are orientated such that major axes thereof are orientated substantially parallel to the first cross section (see FIGS. 1A and 2A), and more fibrous particles 5 in the interface side region 32 are orientated such that major axes thereof are orientated substantially parallel to the second cross section (see FIGS. 1B and 2B).

Here, when an average particle size of the fibrous particles in the sliding surface side region of the first cross-section is represented by "$D_{sur, first}$"; that in the sliding surface side region of the second cross-section is represented by "$D_{sur, second}$"; that in the interface side region of the first cross-section is represented by "$D_{int, first}$": and that in the interface side region of the second cross-section is represented by "$D_{int, second}$", they satisfy following relations.

$D_{sur, first}$ is 5 to 30 µm, and $D_{sur, second}$ is 5 to 20% of $D_{sur, first}$, and $D_{int, second}$ is 5 to 30 µm, and $D_{int, first}$ is 5 to 20% of $D_{int, second}$.

The average particle sizes $D_{sur, first}$ and $D_{int, second}$ are determined to be 5 to 30 µm for the following reason. When the average particle sizes are smaller than 5 µm, an effect of increasing strength (resistance to deformation) of the sliding layer 3 decreases. When the size exceeds 30 shear is easily generated in the fibrous particles 5 under a load applied to the sliding layer 3 from the shaft member.

The volume ratio of the fibrous particles 5 in the sliding layer 3 of the sliding member 1 is determined as 10 to 35% for the following reason. When the ratio is smaller than 10%, strength (resistance to deformation) of the sliding layer 3 decreases. When the ratio exceeds 35%, the sliding layer 3 becomes brittle and thus an amount of wear easily increases during sliding.

When the first cross-section of the sliding member 1 is observed, the sliding surface side region 31 includes fibrous particles which have a length of a major axis being not shorter than and such fibrous particles are included by not less than 10 volume % relative to a total volume of the fibrous particles in the sliding surface side region 31. This volume ratio is preferably not less than 30%. On the other hand, when the second cross-section of the sliding member 1 is observed, the interface side region 32 includes fibrous particles which have a length of a major axis being not shorter than 20 and such fibrous particles are included by not less than 10 volume % of relative to a total volume of the fibrous particles in the interface side region 32. This volume ratio is also preferably not less than 30%. Here, the "length of the major axis" is defined as a length of the fibrous particle in a direction in which the fibrous particles have a maximum length in the cross-section. The fibrous particles having the length of the major axis being not shorter than 20 µm have a large effect of increasing strength, i.e., resistance to deformation, of the sliding layer 3. When the sliding layer includes not less than 10 volume % of "fibrous particles having the length of the major axis being not shorter than 20 µm" relative to the total volume of the fibrous particles, high strength or resistance to deformation can be obtained in in a direction where such fibrous particles are oriented in the sliding surface side region 31 and the interface side region 32

The synthetic resin 4 is preferably one or more selected from polyether ether ketone, polyether ketone, polyether sulfone, polyamide imide, polyimide, polybenzimidazole, nylon, phenol, epoxy, polyacetal, polyphenylene sulfide, polyethylene, and polyether imide. The fibrous particles 5 are preferably one or more selected from glass fibrous particles, ceramic fibrous particles, carbon fibrous particles, aramid fibrous particles, acrylic fibrous particles, and polyvinyl alcohol fibrous particles. However, the synthetic resin 4 and the fibrous particles 5 may be of other materials.

The sliding layer 3 may further include one or more solid lubricants selected from graphite, molybdenum disulfide, tungsten disulfide, boron nitride, and polytetrafluoroethylene. The solid lubricant/lubricants can improve sliding properties of the sliding layer 3. The sliding layer 3 may further include 1 to 10 volume % of one or more fillers selected from $CaF_2$, $CaCo_3$, talc, mica, mullite, iron oxide, calcium phosphate, potassium titanate, and $Mo_2C$ (molybdenum carbide). The filler/fillers can improve wear resistance of the sliding layer 3.

The sliding layer 3 preferably has a thickness of 0.5 to 6 mm, where the thickness of the sliding member is defined as a distance from the sliding surface 30 to the interface 7 between the sliding layer 3 and the back metal layer 2 in a direction perpendicular to the sliding surface 30.

In the first cross-section, a dispersion index S of the "fibrous particles 5 which have the major axis length of not shorter than 20 µm" dispersed in the sliding surface side region 31 is not less than 5. Furthermore, in the second cross-section, a dispersion index S of the "fibrous particles 5 which have the major axis length of not shorter than 20 µm" dispersed in the interface side region 32 is not less than 5. The dispersion index S is defined as an average ratio X1/Y1 of the fibrous particles 5. Here, "X1" represents a length of the fibrous particles 5 in a direction parallel to the sliding surface 30 in an object cross-section (i.e. first or second cross-section), and "Y1" represents a length of the fibrous particles 5 in a direction perpendicular to the sliding surface 30 in the first or second cross-section (see FIG. 4).

The dispersion index S of the fibrous particles 5 is not less than 5 in the sliding surface side region 31 of the sliding layer 3 in the first cross-section. The value of the dispersion index indicates that a large percentage of the fibrous particles 5 are orientated such that the major axis thereof is directed along the sliding surface 30 and in the first direction. Thus, the sliding surface side region 31 therefore exhibits such an anisotropic property that it has higher strength (high resistance to deformation) to a load applied parallel to the sliding surface 30 and in the first direction.

On the other hand, the dispersion index S of the fibrous particles 5 is not less than 5 in the interface side region 32 of the sliding layer 3 in the second cross-section. A large percentage of the fibrous particles 5 are orientated such that the major axis thereof is directed along the sliding surface 30 and in the second direction in the interface side region 32. Accordingly, the interface side region 32 of the sliding layer 3 has higher strength (high resistance to deformation) against a load applied parallel to the sliding surface 30 and in the second direction.

Since the fibrous particles 5 are oriented in this manner, even if the shaft member slides for a certain time period in direct contact with the sliding surface 30 of the sliding layer 3 in a stopping time period of the bearing device, the sliding surface side region 31 of the sliding layer 3 including the sliding surface 30 has high strength (resistance to deformation) against a load applied in the first direction, and the interface side region 32 has high strength (resistance to deformation) against a load applied in the second direction. Accordingly, the strength of the deformation resistance of the sliding layer against a load is dispersed in the first direction and the second direction substantially perpendicular to each other. That is, a load applied to the surface of the sliding layer is mitigated from a boundary of the layers to the interface side region having different orientation of the fibrous particles, thereby preventing transmission of the load to the interface between the sliding layer and the back-metal layer. Thus, shear is less likely to be caused by a difference in amount of elastic deformation between the back-metal layer made of a metal and the sliding layer made of a synthetic resin.

Furthermore, the major axes of the fibrous particles in the sliding surface side region 31 and the interface side region 32 are oriented parallel to the sliding surface. Even when a large load is applied from the shaft member to the sliding layer (due to a large weight of the shaft member of the large bearing device), the entire sliding layer has high strength in a direction parallel to the sliding layer, and thus internal cracks (in a vertical direction of the sliding layer) are less likely to occur.

Through the above mechanism, the sliding member 1 of the present invention is prevented from generation of damages such as cracks inside of the sliding layer 3 (in a vertical direction of the sliding layer) and thus shear between the sliding member and the back metal is prevented, even though the sliding surface 30 is in direct contact with a surface of a counter shaft during the stopping period of the bearing device.

The sliding surface side region 31 and the interface side region 32 of the sliding layer may include approximately the same amount of fibrous particles, and they may include approximately the same amount of "fibrous particles which have the major axis length of not shorter than 20 µm".

Furthermore, the dispersion indexes of the "fibrous particles which have the major axis length of shorter than 20 µm" dispersed in the sliding surface side region 31 and the interface side region 32 of the sliding layer may be approximately the same as the dispersion indexes of the "fibrous particles which the major axis length of not shorter than 20 µm" dispersed in the sliding surface side region 31 and the interface side region 32, respectively.

In the sliding surface side region of the first cross-section, an average aspect ratio of the "fibrous particles which have the major axis length of not shorter than 20 µm" is preferably 1.5 to 10, more preferably 5 to 10, and still more preferably 7 to 10. In the interface side region of the second cross-section, an average aspect ratio of the "fibrous particles which have the major axis length of not shorter than 20 µm" is preferably 1.5 to 10, more preferably 5 to 10, and still more preferably 7 to 10. The average aspect ratio relates to orientation of the fibrous particles. When the major axes of the fibrous particles are not oriented substantially parallel to a cross section (in an axial direction or a circumferential direction) to be observed, the aspect ratio is close to 1 (e.g., less than 1.5). If the average aspect ratio is less than 1.5, the effect of increasing the strength (resistance to deformation) of the resin layer is reduced. In this case, even if the "fibrous particles which have the major axis length of not shorter than 20 µm" have different orientations between the sliding surface side region and the interface side region, a difference in anisotropy of the deformation resistance is more likely to be insufficient, and thus the above effect is less likely to be obtained. On the other hand, if the average aspect ratio is more than 10, fibrous particles may be sheared under a load applied from the shaft member to the sliding layer.

Figure 5:
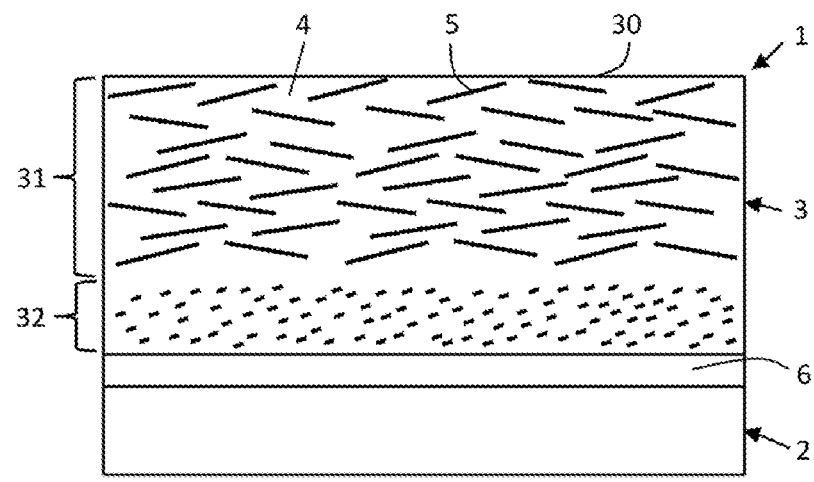
FIG. 5 shows a first cross section of a sliding member according to another embodiment of the present invention.
Figure 6:
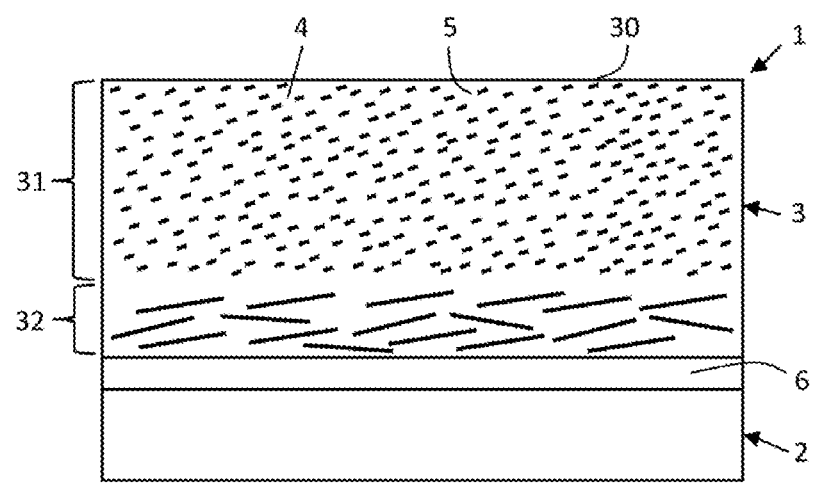
FIG. 6 shows a second cross section of a sliding member according to another embodiment of the present invention.

The back metal layer 2 may include a porous metal portion 6 on its surface that is an interface between the back metal layer 2 and the sliding layer 3. FIGS. 5 and 6 schematically depict, respectively, first and second cross sections of the sliding member 1 in an embodiment in which the back metal layer 2 includes the porous metal portion 6. When the porous metal portion 6 is formed on the surface of the back metal layer 2, bonding strength between the sliding layer 3 and the back metal layer 2 increases. More specifically, the porous metal portion 6 increases a bonding force between the back metal layer 2 and the sliding layer 3 by an anchor effect, since a material of the sliding layer 3 impregnates in pores of the porous metal portion 6.

The porous metal portion 6 may be produced by sintering a metal powder such as Cu, Cu alloy, Fe, or an Fe alloy on a surface of a metal plate, a strip or the like. The porous metal portion 6 may have porosity of approximately 20 to 60%. The porous metal portion 6 may have a thickness of approximately 50 to 500 µm. In this case, the sliding layer 3 coated on a surface of the porous metal portion 6 may have a thickness of 0.5 to 6 mm. However, these dimensions are mere examples, and other dimensions may be adopted.

Embodiments of the present invention will be described below. However, the present invention is not limited to these embodiments.

First Embodiment

In a first embodiment, the first cross section is substantially parallel to the center axis of the sliding member 1. Thus, in the sliding surface side region 31, a higher percentage of fibrous particles 5 near the center axis of the sliding member 1 are orientated such that major axes are substantially parallel to the center axis, while in the interface side region 32, a higher percentage of fibrous particles 5 near the center axis of the sliding member 1 has are orientated such that major axes are substantially perpendicular to the center axis. It is generally said that, in the sliding member 1 having a partial annular shape having a center angle of approximately 25° to 60°, a direction of the center axis approximately corresponds to the radial direction of the partial annular shape, and a direction perpendicular to the center axis approximately corresponds to the circumferential direction of the partial annular shape. Thus, higher percentage of the fibrous particles 5 in the sliding surface side region 31 are orientated such that major axes are substantially parallel to the radial direction, and higher percentage of the fibrous particles 5 in the interface side region 32 are orientated such that major axes are substantially parallel to the circumferential direction. In the sliding member of the first embodiment, therefore, the sliding surface side region 31 has a high deformation resistance in the radial direction, and the interface side region 32 has a high deformation resistance in the circumferential direction.

Since the fibrous particles 5 are oriented in this manner, when the bearing device is in the stopping period and the shaft member is in direct contact with and slides against the sliding surface 30 of the sliding layer 3 for a certain time, the resistance to deformation of the sliding layer against a load is dispersed in the radial direction and the circumferential direction, thereby having the above effect of preventing shear of the back-metal layer and the sliding layer. In particular, when the sliding member 1 is used for a thrust bearing, a sliding direction of the sliding member 1 against the shaft member is the circumferential direction of the sliding member 1. In the first embodiment, the interface side region 32 has a high deformation resistance in the circumferential direction, and thus the amount of deformation in the circumferential direction of the interface side region 32 is small relative to a load of the shaft member applied to the sliding layer 3. Thus shear is even less likely to be caused by a difference in amount of elastic deformation between the sliding layer 3 and the back-metal layer 2. Furthermore, since the major axes of the fibrous particles are oriented parallel to the sliding surface both in the sliding surface side region 31 and the interface side region 32, internal cracks in the vertical direction of the sliding layer are less likely to occur as described above.

Second Embodiment

In a second embodiment, the second cross section is substantially parallel to the center axis of the sliding member 1. Thus, in the sliding surface side region 31, a higher percentage of fibrous particles 5 near the center axis of the sliding member 1 are oriented such that major axes are substantially perpendicular to the center axis, while in the interface side region 32, a higher percentage of fibrous particles 5 are orientated such that major axes are substantially parallel to the center axis. As described in the first embodiment, It is generally said that, in the sliding member 1 having a partial annular shape having a center angle of approximately 25° to 60°, a direction of the center axis approximately corresponds to the radial direction of the partial annular shape, and a direction perpendicular to the center axis approximately corresponds to the circumferential direction of the partial annular shape. Thus, higher percentage of the fibrous particles 5 in the sliding surface side region 31 are orientated such that major axes are substantially parallel to the circumferential direction, and higher percentage of the fibrous particles 5 in the interface side region 32 are orientated such that major axes are substantially parallel to the radial direction. In the sliding member of the second embodiment, therefore, the sliding surface side region 31 has a high deformation resistance in the circumferential direction, and the interface side region 32 has a high deformation resistance in the radial direction.

Since the fibrous particles 5 are oriented in this manner, when the bearing device is in the stopping period and the shaft member is in direct contact with and slides against the sliding surface 30 of the sliding layer 3 for a certain time, the resistance to deformation of the sliding layer against a load is dispersed in the radial direction and the circumferential direction, as the case of the first embodiment, thereby having the above effect of preventing shear of the back-metal layer and the sliding layer. Since the major axes of the fibrous particles are oriented parallel to the sliding surface both in the sliding surface side region 31 and the interface side region 32 unlike JP 2018-146059A, internal cracks in the vertical direction of the sliding layer are less likely to occur as described above.

Third Embodiment

In a third embodiment, the first cross section is parallel to a direction inclined at approximately 40° to 50° from the center axis of the sliding member 1. In this case, the second cross section is parallel to a direction inclined, opposite to the first cross section, at approximately 40° to 50° from the center axis of the sliding member 1. Thus, in the sliding surface side region 31, higher percentage of the fibrous particles 5 are orientated such that major axes are oriented in a direction inclined at approximately 40° to 50° from the center axis and the circumferential direction, while in the interface side region 32, higher percentage of the fibrous particles 5 are orientated such that major axes are oriented substantially parallel to a direction inclined, opposite to the first cross section, at approximately 40° to 50° from the center axis and the circumferential direction.

Also in a case where the fibrous particles 5 are oriented in this manner, when the bearing device is in the stopping period and the shaft member is in direct contact with and slides against the sliding surface 30 of the sliding layer 3 for a certain time, the resistance to deformation of the sliding layer against a load is dispersed in the radial direction and the circumferential direction, thereby having the above effect of preventing shear of the back-metal layer and the sliding layer. In particular, when the sliding member 1 is used for a thrust bearing, t the fibrous particles 5 is orientated in two directions inclined at approximately 40° to 50° to the left and right from the sliding direction (i.e., circumferential direction). In the case, the resistance to deformation against the load is almost uniformly divided in the two direction, and thus the effect of dividing the deformation resistance is enhanced and the effect of preventing the occurrence of shear is improved. Furthermore, since the major axes of the fibrous particles are oriented parallel to the sliding surface both in the sliding surface side region 31 and the interface side region 32, internal cracks in the vertical direction of the sliding layer are less likely to occur as described above.

As the above, three embodiments are explained. However, the present invention is not limited to these embodiments, but the first cross section may be taken in any other direction.

The above sliding member may be used for e.g. a thrust bearing. For example, this bearing may include a housing defining an annular recess. A plurality of sliding members may be arranged in the annular recess along its circumferential direction, in order to support a counter shaft, i.e. a thrust collar surface of a shaft member. The shape (e.g., curvature and size) of the sliding members is designed to match with the annular recess and the shaft member. However, the sliding member may be also used for other bearings or for other sliding applications.

The present invention is also directed to a thrust bearing including a plurality of the above sliding members.

A process of manufacturing the above sliding member is described in detailed hereinafter.

(1) Preparation of Fibrous Particle Material

Examples of the material of the fibrous particles include artificially produced inorganic fibrous particles (e.g., glass fibrous particles or ceramic fibrous particles), and organic fibrous particles (e.g., carbon fibrous particles, aramid fibers, acrylic fibrous particles, or polyvinyl alcohol fibrous particles).

(2) Preparation of Synthetic Resin Material Particles

Particles having an average particle size of 7 to 30 µm and an aspect ratio of 5 to 100 are preferable for the synthetic resin material. The synthetic resin may be one or more selected from polyether ether ketone, polyether ketone, polyether sulfone, polyamide imide, polyimide, polybenzimidazole, nylon, phenol, epoxy, polyacetal, polyphenylene sulfide, polyethylene, and polyether imide.

(3) Manufacture of Resin Composition Sheet

A resin composition sheet is produced from the above materials or other with use of a melt-kneading machine, a supply mold, a sheet forming mold, and cooling rolls.

"Melt-Kneading Machine"

The melt-kneading machine mixes the synthetic resin material particles, the fibrous particle material, and other optional materials, such as solid lubricant o filler, while heating the materials at a temperature of 230 to 390° C. to produce a resin composition in a molten state. The molten resin composition is extruded from the melt-kneading machine under fixed pressure.

"Supply Mold"

The molten resin composition is extruded from the melt-kneading machine and is constantly supplied to the sheet forming mold via the supply mold in a constant amount. The supply mold has a heater to heat the resin composition passing through the supply mold at 385 to 400° C. to maintain the resin composition in a molten state.

"Sheet Forming Mold"

The resin composition is formed into a sheet shape by the sheet forming mold. The molten resin composition supplied from the supply mold to the sheet forming mold is formed into a sheet shape, and then gradually naturally cooled, while the sheet moves toward an outlet in the sheet forming mold, to form a sheet in a semi-molten state.

"Cooling Roll"

The resin composition sheet in a semi-molten state is drawn from the "sheet forming mold" while being cooled continuously in contact with the cooling roll. The cooling roll is constituted by at least a pair of rolls (upper roll and lower roll) that press the resin composition sheet from upper and lower sides and transfer it. The resin composition sheet after drawn from the cooling roll is in a completely solid state. A temperature of the cooling roll can be controlled by an electric heater incorporated in the roll, and the cooling roll can be driven to rotate controllably by an electric motor. The resin composition sheet has, for example, a thickness of 1 to 7 mm. The resin composition sheet in a solid state is cut into a size matching a size of a back metal used at a coating step described later.

(4) Back Metal

As the back metal layer, a metal plate made of an Fe alloy such as a hypoeutectoid steel or a stainless steel, Cu, a Cu alloy or the like may be used. A porous metal portion may be formed on a surface of the back metal layer, i.e., on the side facing an interface between the back metal layer and the sliding layer. The porous metal portion may have a same composition as the back metal layer. Alternatively, the porous metal portion may have a different composition or may be of different material from the back metal layer.

(5) Coating and Molding Step

The resin composition sheet is bonded to one surface of the back metal layer, or to the porous metal portion of the back metal. Subsequently, the back metal with the resin composition sheet is cut in a shape for use, such as a partial annular shape. Then, the back metal are processed or cut to make a thickness of the composition uniform. The molding is performed such that a drawn direction of the resin composition sheet in the sheet forming step becomes a predetermined direction of the partial annular shape. Then, a surface is cut off to have a predetermined thickness.

Structure Control

Next, a structure control method for controlling orientations of the fibrous particles is hereinafter described. The structure control is performed by setting a temperature of the cooling roll in the manufacturing process of the resin composition sheet. Specifically, a temperature of the upper cooling roll is set at a temperature (at 170° C. to 180° C.) higher by approximately 50° C. to 60° C. than a temperature of the lower cooling roll. On the other hand, in a conventional cooling roll, the temperatures of the upper cooling roll and the lower cooling roll have been set at the same temperature (at 110° C. to 130° C.).

Figure 7A:
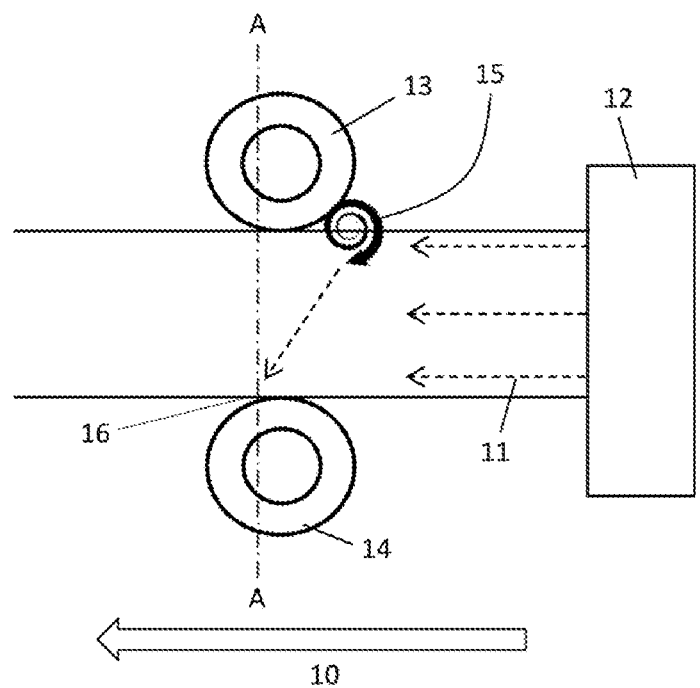
FIG. 7A shows a view for explaining a flow of resin.
Figure 7B:
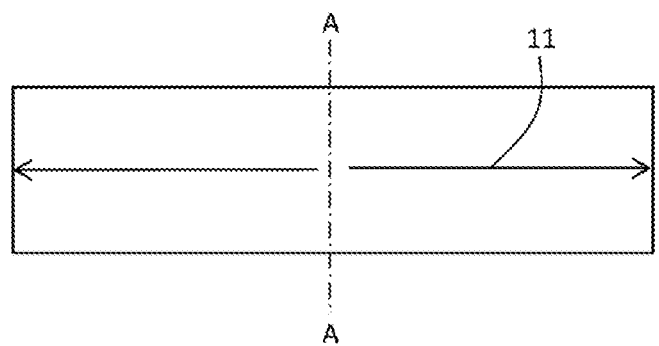
FIG. 7B shows a A-A cross section in FIG. 7A.

The resin composition sheet in a semi-molten state is solidified while being cooled in contact with the cooling roll. Since the temperature of the lower cooling roll is set to be lower than the temperature of the upper cooling roll, a lower surface of the resin composition sheet starts to be solidified earlier. Since the temperature of the upper cooling roll is higher than the temperature of the lower cooling roll, the resin composition in a semi-molten state that has not been completely solidified tends to be accumulated (hereinafter referred to as "resin accumulation") at an inlet of the upper cooling roll. FIG. 7A schematically shows this state. The resin composition sheet is drawn in a direction (drawing direction 10) from the right side toward the left side of FIG. 7A. Arrow 11 shows a flow of the resin composition in a semi-molten state. The resin composition 11 in a semi-molten state that has flowed from a sheet forming mold 12 (from the right side of FIG. 7A) forms a certain amount of resin accumulation 15 at an inlet of an upper cooling roll 13. The resin composition 11 in a semi-molten state (hereinafter referred to as "semi-molten resin composition") that forms the resin accumulation 15 is accumulated as being rotated in the same direction as the drawing direction, and the resin composition 11 is pushed into an inside of the resin composition sheet. Since the inside of the resin composition sheet is not in contact with the cooling roll, the resin composition sheet therein maintains in a semi-molten state during the resin composition sheet is passing through the cooling roll. The semi-molten resin composition 11 pushed into the inside of the resin composition sheet collides against a lower surface 16 of the resin composition sheet that has been already solidified by the lower cooling roll 14, and then the semi-molten resin composition 11 spreads and flows toward both ends in a width direction of the resin composition sheet (see FIG. 7B) and starts to be solidified. Thus, near a center portion of the resin composition sheet in a thickness direction, major axes of the fibrous particles are more likely to be oriented in the width direction of the resin composition sheet (i.e., a direction perpendicular to the drawing direction 10). In the vicinity of surfaces of the resin composition sheet (upper and lower surfaces of the sheet), on the other hand, the semi-molten resin composition sheet is constantly flowing in a single direction toward an outlet of the cooling roll and is solidified by the contact with the cooling roll. Thus, major axes of the fibrous particles are more likely to be oriented in a longitudinal direction (drawing direction 10) on the surface of the resin composition sheet.

In a conventional method, the temperatures of the upper cooling roll and the lower cooling roll have been set at the same temperature. In this case, the semi-molten resin composition that has flowed from the sheet forming mold constantly flows in a single direction toward the outlet without forming a resin accumulation at the inlet of the cooling roll. Accordingly, the fibrous particles have the major axis orientated parallel to a surface of the sheet throughout the sheet.

When the resin composition sheet is manufactured by a conventional injection molding, the molten resin composition is injected in a moment from a supply port of the sheet forming mold. In this case, collision and junction of the molten resin composition occur at various positions within the mold. The collision and junction of the resin composition produce different orientations between a portion where the resin composition flows in one direction and a portion where the collision occurs. As a result, the resin composition sheet has a mixture of portions where the fibrous particles are orientated parallel to the surface of the sheet and portions where the fibrous particles are oriented at random (weld portions) as viewed from the surface.

As described in JP-A-2013-194204 where a resin composition sheet is manufactured through an injection molding process from a resin composition including synthetic resin, cross-linking promotor and fibrous particles, the fibrous particles are dispersed in a non-oriented (isotropic) manner.

As disclosed in JP 2018-146059A where a resin composition sheet is manufactured by cooling a resin composition in the forming mold and periodically changing a drawing speed of a cooling roll, fibrous particles are dispersed such that major axes of the fibrous particles are oriented perpendicular to a surface of the sheet in a center region of a thickness direction, while fibrous particles are dispersed such that major axes of the fibrous particles are oriented parallel to the surface of the sheet in the vicinity of the surface of the sheet.

Next, a method of dividing a sliding surface side region and an interface side region are described herein. Electronic images of a plurality of portions of the first cross section and the second cross section of the sliding member are taken at a magnification of 200 times with use of an electron microscope. In the first cross section, a large number of elongated fibrous particles oriented approximately along the sliding surface are observed near the sliding surface (see FIG. 1A), while almost no such elongated fibrous particles are observed and most of the fibrous particles are spherical or spheroidal particles near the interface between the sliding layer and the back-metal layer (see FIG. 1B). In the second cross section, on the other hand, almost no elongated fibrous particles are observed and most of the fibrous particles are spherical or spheroidal particles near the sliding surface (see FIG. 2A), and a large number of elongated fibrous particles are observed near the interface between the sliding layer and the back-metal layer (see FIG. 2B). These two regions having different forms of the fibrous particles are observed as two layers laminated in a thickness direction of the sliding layer. Thus, a boundary line between the two regions is determined by observing the plurality of first and second cross sections, and a virtual (boundary) line UL can be drawn parallel to the sliding surface. A region from the sliding surface to the virtual line UL is defined as the sliding surface side region, and a region from the interface between the sliding layer and the back-metal layer to the virtual line UL is defined as the interface side region. In FIG. 1, the virtual line UL is indicated by a dotted line.

When a porous portion is formed on the surface of the back-metal layer, the surface of the back-metal layer has concave and convex portions. In this case, the interface between the sliding layer and the back-metal layer is indicated by a virtual line that is parallel to the sliding surface and passes through an apex of a convex portion on the surface of the back-metal layer (i.e. porous portion) located closest to the sliding surface in the images.

In each of the cross sections, an average particle size of the fibrous particles in the sliding surface side region and the interface side region is measured by the following method.

Electron images of a plurality of positions in a first cross section and second cross section of the sliding member are taken with use of the electronic microscope at 200 magnifications. The average particle size of the fibrous particles is obtained by measuring an area of each fibrous particle from the electron images by a typical image analysis method (analysis software: Image—Pro Plus (version 4.5) manufactured by Planetron Inc.), and a diameter of a circle having the measured area is calculated (i.e. equivalent circle diameter) and an average is obtained. However, the magnification is not limited to 200 and other magnification may be used.

Next, measuring of a volume ratio of fibrous particles having the major axis length of not shorter than 20 μm in relation to the total volume of the fibrous particles in the sliding layer is explained below. The fibrous particles in the above images of the sliding surface side region and the interface side region in the first and second cross sections are classified into a group of fibrous particles having a major axis length of not shorter than 20 μm and a group of the other fibrous particles with use of a typical image analysis method (e.g., analysis software: Image—Pro Plus (version 4.5) manufactured by Planetron Inc.). A total area of all the fibrous particles observed in the images, and a total area of the fibrous particles having a major axis length of not shorter than 20 μm in the images are measured. Thus, a ratio of the total area of the fibrous particles having a major axis length of not shorter than 20 μm in relation to the total area of all fibrous particles is obtained. Please note that this obtained area ratio corresponds to a volume ratio.

Figure 3:
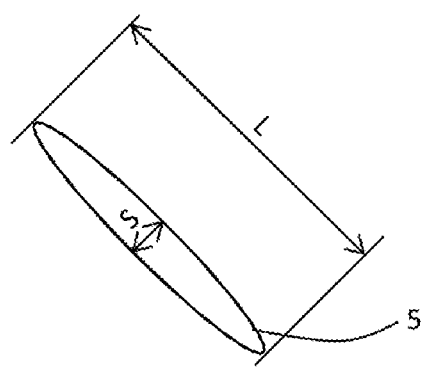
FIG. 3 shows a view for explaining an aspect ratio (A) of a fibrous particle.

The average aspect ratio A is obtained as an average ratio of a major axis length L to a minor axis length S (major axis length L/minor axis length S) of the fibrous particles having a major axis length of not shorter than 20 μm from the electron images taken by the above method (see FIG. 3) The major axis length L of the fibrous particle indicates a length measured in a first direction in which the particle has a maximum length in the electron image, while the minor axis length S indicates a maximum length measured in a second direction perpendicular to the first direction.

Figure 4:
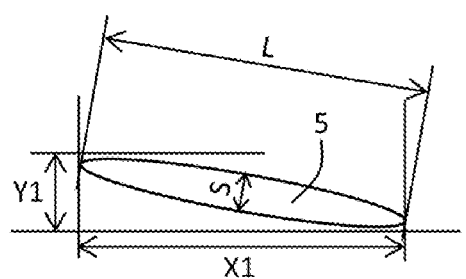
FIG. 4 shows a view for explaining a dispersion index (S) of a fibrous particle.

The dispersion index S of the fibrous particles is obtained by measuring a length X1 of the fibrous particle having a major axis length of not shorter than 20 μm in the direction parallel to the sliding surface, and the length Y1 of the fibrous particle in the direction perpendicular to the sliding surface, in the sliding surface side region of the first cross-section and the interface side region of the second cross-section, and calculating an average ratio of X1/Y1 based on the electron images (see FIG. 4). As the dispersion index S of the fibrous particles indicates a value closer to zero, the dispersed fibrous particles are more oriented in the direction perpendicular to the sliding surface. As the dispersion index S indicates a larger value greater than 5, the major axis is more oriented in the direction parallel to the sliding surface.

EXAMPLES

Examples 1 to 12 of the sliding members including a back-metal layer and a sliding layer according to the present invention and Comparative Examples 21 to 28 were produced in the following manner. Table 1 shows compositions of the sliding layers of the sliding members of Examples and Comparative Examples.

TABLE 1

| | | Composition (volume %) | | | | | | | Fibrous particles Average particle size (μm) | | | |
| --- | --- | --- | --- | --- | --- | --- | --- | --- | --- | --- | --- | --- |
| | | | | | | | | | First cross-section | | Second cross-section | |
| | | Synthetic resin | Fibrous particles | | Solid lubricant | | | Cross-linking promoter | Sliding surface side region | Interface side region | Sliding surface side region | Interface side region |
| Items | | PEEK | PF | Carbon fiber | Glass fiber | Gr | MoS$_2$ | CaF$_2$ | | | | |
| Examples | 1 | 90 | — | 10 | — | — | — | — | — | 5 | 0.3 (5%) | 0.3 (5%) | 5 |
| | 2 | 80 | — | — | 20 | — | — | — | — | 30 | 5.4 (18%) | 5.4 (18%) | 30 |
| | 3 | 70 | — | 30 | — | — | — | — | — | 15 | 3 (20%) | 3 (20%) | 15 |
| | 4 | 75 | — | 20 | — | — | — | 5 | — | 24 | 4.3 (18%) | 4.3 (18%) | 24 |
| | 5 | 70 | — | 25 | — | — | 5 | — | — | 27 | 5.1 (19%) | 5.1 (19%) | 27 |
| | 6 | 65 | — | 35 | — | 5 | — | 5 | — | 28 | 5.3 (19%) | 5.3 (19%) | 28 |
| | 7 | 60 | — | — | 20 | — | 10 | 10 | — | 25 | 4.8 (19%) | 4.8 (19%) | 25 |
| | 8 | 70 | — | 15 | — | 5 | — | 10 | — | 25 | 5 (20%) | 5 (20%) | 25 |
| | 9 | 75 | — | — | 15 | — | 5 | 5 | — | 24 | 4.8 (20%) | 4.8 (20%) | 24 |
| | 10 | — | 75 | — | 25 | — | — | — | — | 5 | 0.3 (5%) | 0.3 (5%) | 5 |
| | 11 | 70 | — | 30 | — | — | — | — | — | 14 | 2.8 (20%) | 2.8 (20%) | 14 |
| | 12 | 70 | — | 30 | — | — | — | — | — | 16 | 3.2 (20%) | 3 (20%) | 15 |
| Comparative Examples | 21 | 70 | — | — | 30 | — | — | — | — | 3.5 | 0.5 (13%) | 0.5 (13%) | 3.5 |
| | 22 | 70 | — | — | 30 | — | — | — | — | 33 | 6.6 (20%) | 6.6 (20%) | 33 |
| | 23 | 95 | — | 5 | — | — | — | — | — | 21 | 4 (19%) | 4 (19%) | 21 |
| | 24 | 60 | — | 40 | — | — | — | — | — | 18 | 3.2 (18%) | 3.2 (18%) | 18 |
| | 25 | 70 | — | — | 30 | — | — | — | — | 1.5 | | | 16.1 |
| | 26 | — | 70 | 25 | — | — | — | — | 5 | 2.5 | | | 2.5 |
| | 27 | 70 | — | — | 30 | — | — | — | — | 16.1 | | | 1.5 |
| | 28 | 90 | — | 20 | — | — | — | — | — | 15 | 3 (20%) | 3 (20%) | 15 |

| Fibrous particles | | | | | | Thickness ratio (%) of interface side region | Evaluation | | |
| --- | --- | --- | --- | --- | --- | --- | --- | --- | --- |
| Average aspect ratio (A) | | Dispersion index (S) | | Volume ratio (%) | | | | | |
| First cross-section Sliding surface side region | Second cross-section Interface side region | First cross-section Sliding surface side region | Second cross-section Interface side region | First cross-section Sliding surface side region | Second cross-section Interface side region | | Internal crack | Shear at interface | Amount of wear (μm) |
| 1.3 | 5 | 5.6 | 5.0 | 12 | 11 | 50 | absence | absence | 26.8 |
| 3.1 | 6.8 | 6.3 | 6.3 | 28 | 26 | 35 | absence | absence | 20.4 |
| 3.7 | 7.4 | 7.1 | 6.4 | 27 | 26 | 30 | absence | absence | 20 |
| 5.4 | 9.9 | 7.0 | 6.7 | 33 | 34 | 15 | absence | absence | 18.3 |
| 6.3 | 10.8 | 7.2 | 7.3 | 37 | 39 | 20 | absence | absence | 18.7 |
| 7.2 | 11.7 | 7.6 | 7.4 | 39 | 41 | 15 | absence | absence | 17.4 |
| 13.9 | 9.4 | 6.6 | 7.0 | 31 | 33 | 20 | absence | absence | 18.1 |
| 14.5 | 10 | 7.1 | 6.8 | 31 | 32 | 15 | absence | absence | 18 |
| 10.4 | 5.9 | 7.4 | 6.3 | 37 | 39 | 20 | absence | absence | 18.6 |
| 1.7 | 5.4 | 5.2 | 5.4 | 11 | 10 | 45 | absence | absence | 25.8 |
| 3.6 | 7.2 | 6.9 | 6.5 | 26 | 26 | 25 | absence | absence | 19.9 |
| 3.5 | 7.3 | 7.2 | 6.6 | 25 | 26 | 25 | absence | absence | 20.2 |
| 5 | 1.3 | 5.2 | 5.6 | 5 | 7 | 15 | absence | presence | 53.3 |
| 6.8 | 3.1 | 5.3 | 5.1 | 21 | 24 | 15 | absence | presence | 42.6 |
| 6.8 | 3.1 | 5.1 | 5.1 | 24 | 25 | 15 | absence | presence | 47.9 |
| 7.4 | 3.7 | 6.2 | 7.1 | 24 | 27 | 15 | absence | presence | 41.4 |
| — | 10.1 | — | 8.1 | — | 95 | 15 | absence | presence | 22.8 |
| 5.1 | 5.2 | 1.1 | 1.3 | 11 | 10 | — | presence | presence | 34.1 |
| 10.1 | — | 8.1 | — | 95 | — | 15 | absence | presence | 28.2 |
| 7.1 | 3.2 | 6.2 | 6.2 | 27 | 28 | 10 | absence | presence | 23.1 |

Material particles for the fibrous particles used in Examples 1 to 12 and Comparative Examples 21 to 28 in Table 1 have an average particle size of 7 to 35 μm, and an average aspect ratio (major axis length/minor axis length) of 5 to 100.

The material for the synthetic resin used in Examples 1 to 12 and Comparative Examples 21 to 28 were polyether ether ketone (PEEK) particles or phenol (PF) particles. These particles had an average size of 125% of that of the material of the fibrous particles.

The material particles for the solid lubricant ($MoS_2$, Gr) used in Examples 5 to 9 have an average size of 30% of that of the material of the fibrous particles, while the material particles for the filler ($CaF_2$) have an average size of 25% of that of the material of the fibrous particles. The material particles for the cross-linking promotor used in Comparative Example 26 have an average size of 25% of that of the material of the fibrous particles.

The above materials were mixed at a composition ratio in Table 1, and the compositions were pressed in pellets. The pellets were charged into a melt-kneading machine, and sequentially passed through a supply mold, a sheet forming mold, and a cooling roll to produce a resin composition sheet. For Examples 1 to 9, 11 and 12 and Comparative Examples 21 to 25, 27 and 28, a heating temperature of the melt-kneading machine was set at 350 to 390° C., and for Example 10 the heating temperature was set at 230 to 250° C. With regard to a temperature of the cooling roll for Examples 1 to 12 and Comparative Examples 21 to 24, a temperature of an upper cooling roll was set at 180° C., and a temperature of a lower cooling roll was set at 130° C. For Comparative Examples 25 and 27, the temperatures of the upper and lower cooling rolls were set at the same temperature. For Comparative Example 28, the temperature of the upper cooling roll was set at 200° C. and the temperature of the lower cooling roll was set at 100° C. For Comparative Example 26, a resin composition sheet was produced by injection molding as disclosed in JP 2013-194204A.

Subsequently, the produced resin composition sheet was coated on one of surfaces of the back-metal layer made of an Fe alloy, and then processed into a partial annular shape, which was then cut so that the composition on the back metal layer has a predetermined thickness. While the back metal layer of Examples 1 to 9, 11 and 12 and Comparative Examples 21 to 28 was made of an Fe alloy, that of Example 10 includes a porous sintered portion made of a Cu alloy on a surface of the back-metal layer made of an Fe alloy.

For the sliding members of Examples 1 to 6 and 10 to 12 and Comparative Example 27, the resin composition sheet was cut into a predetermined size so that a center axis of the partial annular shape was parallel to a drawing direction of the resin composition sheet through cooling rolls in the sheet forming step, and then the resin composition sheet was coated on the back metal (corresponding to the first embodiment). For the sliding members of Examples 7 to 9 and Comparative Examples 21 to 25 and 28, the resin composition sheet was cut into a predetermined size so that a center axis of the partial annular shape was orthogonal to the drawing direction of the resin composition sheet in the cooling rolls in the sheet forming step, and then the resin composition sheet was coated on the back metal (corresponding to the second embodiment).

The sliding layer of the produced sliding members of Examples 1 to 12 and Comparative Examples 21 to 28 had a thickness of 3 mm, and the back-metal layer had a thickness of 10 mm. In Examples 1 to 12 and Comparative Examples 21 to 25, 27 and 28, one side surface was cut so that the sliding layer had a thickness of 3 mm.

An average particle size of the fibrous particles dispersed in each of a sliding surface side region and an interface side region of Examples and Comparative Examples are measured in an first cross-section and a second cross-section as explained above and the results were shown in the column "average particle size" in Table 1. Also, an average aspect ratio (A) of the "fibrous particles having a major axis length of not shorter than 20 μm" was measured in the sliding surface side region of the first cross-section and the interface side region of the second cross-section as explained above and the results were shown in the column "average aspect ratio (A)" in Table 1. A dispersion index (S) of the "fibrous particles having a major axis length of not shorter than 20 μm" dispersed in the sliding surface side region of the first cross-section and the interface side region of the second cross-section was measured as the above and the results were shown in the column "dispersion index (S)" in Table 1. Furthermore, a volume ratio of the fibrous particles having a major axis length of not shorter than 20 μm in relation to the total volume of the fibrous particles dispersed in the sliding layer was measured in the sliding surface side region of the first cross-section and the interface side region of the second cross-section and the results were shown in the column "volume ratio" in Table 1. The column "thickness ratio (%) of interface side region" in Table 1 shows a ratio of a thickness of the interface side region relative to a thickness of the sliding layer.

A plurality of the sliding members in a partial annular shape were combined into a cylindrical shape and a sliding test was conducted under conditions in Table 2. The conditions simulate a sliding state where operation of a large bearing device is in the stopping period, and a shaft member rotates for a certain time with insufficient oil supply. An amount of wear of the sliding layer after the sliding test for Examples and Comparative Examples were shown in the column "amount of wear (μm)" in Table 1. Furthermore, a specimen of the sliding member after the sliding test was cut in a direction parallel to the center axis of the sliding member and perpendicular to the sliding surface, and the specimen was observed for the presence of "crack" inside of the sliding layer with use of an optical microscope. In a column "Internal crack" in Table 1, "present" indicates that the internal crack was observed, and "absence" indicates that the internal crack was observed.

Furthermore, the specimen was observed for the presence of "shear" at an interface between the sliding layer and the back metal with use of the optical microscope. In a column "Shear at interface" in Table 1, "present" indicates that "shear" at the interface was observed, and "absence" indicates that no "shear" at the interface was observed.

TABLE 2

| Testing machine | Thrust sliding tester |
|---|---|
| Load | 70 MPa |
| Rotation speed | 150 rpm |
| Operation time period | 40 minutes |
| Oil | VG32 |
| Oil feeding rate | 10 cc/minute |
| Oil feeding temperature | 60° C. |
| Opposed shaft | SUJ2 |
| Roughness of opposed shaft | 1.5 Ra |

As seen from the results shown in Table 1, an amount of wear after the sliding test of Examples 1 to 12 was smaller than that of Comparative Examples 21 to 24. Particularly, the wear was considerably reduced in Examples 4 to 9, an average aspect ratio (A) of the fibrous particles of which is 5 to 10. The wear of Examples 4 to 9 was smaller than that of Examples 1 to 3, 11 and 12, since Examples 4 to 9 have the volume ratio of the fibrous particles 5 which have "the major axis length of not shorter than 20 μm" being not less than 30% in both of the sliding surface side region of the first cross-section and the interface side region of the second cross-section, while Examples 1 to 3, 11 and 12 have the volume ratio of less than 30%. It is considered that strength (resistance to deformation) of the sliding layer is more increased as described above.

Furthermore, no internal cracking and no shear at the interface were detected after the sliding test in each of Examples of the invention. It is considered that cracking was prevented by the orientations of the fibrous particles in the sliding surface side region and the interface side region as described above.

In addition to Examples described above, a sample was produced, which center axis was diagonal to the drawing direction of the sheet and was subjected to the same test. Then, the sample showed the same effect.

In contrast, when the fibrous particles in the sliding layer were oriented in the same direction (oriented in a direction parallel to the sliding surface) between the sliding surface side region and the interface side region as in Comparative Examples 25 and 27, it is considered that a load applied on the sliding surface was transmitted to the interface with the back metal and shear was generated at the interface.

In Comparative Example 21, the fibrous particles in the sliding layer side region and the interface side region of the sliding layer had an average particle size of less than 5 μm. Accordingly, an effect of increasing the strength (resistance to deformation) of the sliding layer was small and thus it is considered to have caused a large amount of wear of the sliding layer, and shear at the interface between the sliding layer and the back metal.

In Comparative Example 22, the fibrous particles in the sliding layer side region and the interface side region of the sliding layer had a large average particle size of 30 μm. Accordingly, when a load of the shaft member was applied to the sliding layer, shear was more likely to occur in the fibrous particles and thus falling off of the fibrous particles occurred. It is considered to have caused a large amount of wear of the sliding layer, and shear at the interface between the sliding layer and the back metal.

In Comparative Example 23, the volume ratio of the fibrous particles in the sliding layer side region and the interface side region of the sliding layer was less than 10%. Accordingly, the sliding layer had low strength (resistance to deformation) and is considered to have caused a large amount of wear of the sliding layer, and shear at the interface between the sliding layer and the back metal.

In Comparative Example 24, the volume ratio of the fibrous particles in the sliding layer side region of the sliding layer was more than 35%. Accordingly, the sliding layer was brittle and is considered to have caused a large amount of wear of the sliding layer, cracks on the sliding surface, and shear at the interface between the sliding layer and the back metal.

In Comparative Example 25, the temperatures of the upper cooling roll and the lower cooling roll were set at the same temperature in the production of the resin composition sheet. Accordingly, the fibrous particles in the entire sliding layer, that is both of the sliding surface side region and the interface side region of the sliding layer, were oriented substantially parallel to the sliding surface of the sliding layer, and thus it is considered to that a load applied on the sliding surface was transmitted to the interface with the back metal and shear was generated at the interface.

In Comparative Example 26, the resin composition sheet was produced by injection molding. Accordingly, the fibrous particles in the sliding layer were dispersed in a non-oriented manner in the entire sliding layer. Thus, it is considered to have caused internal cracks of the sliding layer when a load of the shaft member was applied to the sliding layer.

In Comparative Example 27, the fibrous particles in the entire sliding layer, that is both of the sliding surface side region and the interface side region of the sliding layer, were oriented parallel to the sliding surface of the sliding layer. Accordingly, it is considered that a load applied on the sliding surface was transmitted to the interface with the back metal and shear was generated at the interface.

In Comparative Example 28, a thickness of the interface side region was small (10% that is less than 15%), since a large temperature difference was made between the upper and the lower cooling rolls. Accordingly, it is considered that a load applied on the sliding surface was transmitted to the interface with the back metal and shear was generated at the interface.

The invention claimed is:

1. A sliding member for a thrust bearing, the sliding member comprising a back-metal layer and a sliding layer on the back-metal layer,
   wherein the sliding member has a partial annular shape,
   wherein the sliding layer comprises synthetic resin and fibrous particles dispersed in the synthetic resin at a volume ratio of 10 to 35% of the sliding layer,
   wherein the sliding layer is composed of a sliding surface side region including a sliding surface of the sliding layer and an interface side region including an interface between the sliding layer and the back-metal layer, a thickness of the interface side region being 15 to 50% of a thickness of the sliding layer, and
   wherein the sliding layer has a first cross section and a second cross section, the second cross section being perpendicular to the first cross section, the first cross section and the second cross section being perpendicular to the sliding surface, and the first cross-section and the second cross-section satisfying the following relationships (a) to (d):
   (a) in the sliding surface side region, the fibrous particles in view of the first cross-section have an average particle size $D_{sur,\ first}$ of 5 to 30 μm, and the fibrous particles in view of the second cross-section have an average particle size $D_{sur,\ second}$ being 5 to 20% of the average particle size $D_{sur,\ first}$ of the fibrous particles in view of the first cross-section,
   (b) in the interface side region, the fibrous particles in view of the second cross-section have an average particle size $D_{int,\ second}$ of 5 to 30 μm, and the fibrous particles in view of the first cross-section have an average particle size $D_{int,\ first}$ being 5 to 20% of the average particle size $D_{int,\ second}$ in view of the second cross-section,
   (c) in the sliding surface side region in view of the first cross-section, the fibrous particles therein includes fibrous particles having a length of a major axis of not shorter than 20 μm, a volume ratio of the fibrous particles having the major axis length of not shorter than 20 μm to a total volume of the fibrous particles in the sliding surface side region being not less than 10%, and a dispersion index of the fibrous particles having the major axis length of not shorter than 20 μm is not less than 5, and (d) in the interface side region in view of the second cross-section, the fibrous particles therein includes fibrous particles having a length of major axis of not shorter than 20 μm, a volume ratio of the fibrous particles having the major axis length of not shorter than 20 μm to a total volume of the fibrous particles in the interface side region being not less than 10%, and a dispersion index of the fibrous particles having the major axis length of not shorter than 20 μm is not less than 5, wherein the dispersion index is defined as an average of ratios X1/Y1 of the fibrous particles, where X1 represents a length of a fibrous particle in a cross-section in a direction parallel to the sliding surface, and Y1 represents a length of a fibrous particle in the cross-section in a direction perpendicular to the sliding surface.

2. The sliding member according to claim 1, wherein the first cross section is parallel to a center axis of the partial annular shape of the sliding member.

3. The sliding member according to claim 1, wherein the second cross section is parallel to a center axis of the partial annular shape of the sliding member.

4. The sliding member according to claim 1,
wherein, in the sliding surface side region of the first cross-section, an average aspect ratio of the fibrous particles having the major axis length of not shorter than 20 μm is 1.5 to 10, and
wherein in the interface side region of the second cross-section, an average aspect ratio of the fibrous particles having the major axis length of not shorter than 20 μm is 1.5 to 10.

5. The sliding member according to claim 1,
wherein, in the sliding surface side region of the first cross-section, the average aspect ratio of the of fibrous particles having the major axis length of not shorter than 20 μm is 5 to 10, and wherein, in the interface side region of the second cross-section, the average aspect ratio of the fibrous particles having the major axis length of not shorter than 20 μm is 5 to 10.

6. The sliding member according to claim 1,
wherein, in the sliding surface side region of the first cross-section, the volume ratio of the fibrous particles having the major axis length of not shorter than 20 μm to the total volume of the fibrous particles in the sliding surface side region is not less than 30%, and
wherein, in the interface side region of the second cross-section, the volume ratio of the fibrous particles having the major axis length of not shorter than 20 μm to the total volume of the fibrous particles in the interface side region is not less than 30%.

7. The sliding member according to claim 1, wherein the fibrous particles are composed of one or more selected from glass fiber particles, ceramic fiber particles, carbon fiber particles, aramid fiber particles, acrylic fiber particles, and polyvinyl alcohol fiber particles.

8. The sliding member according to claim 1, wherein the synthetic resin is composed of one or more selected from polyether ether ketone, polyether ketone, polyether sulfone, polyamidimide, polyimide, polybenzimidazole, nylon, phenol, epoxy, polyacetal, polyphenylene sulfide, polyethylene, and polyetherimide.

9. The sliding member according to claim 1, wherein the sliding layer further comprises one or more solid lubricants selected from graphite, molybdenum disulfide, tungsten disulfide, boron nitride, and polytetrafluoroethylene.

10. The sliding member according to claim 1, wherein the sliding layer further comprises 1 to 10 volume % of one or more fillers selected from $CaF_2$, $CaCo_3$, talc, mica, mullite, iron oxide, calcium phosphate, potassium titanate, and $Mo_2C$.

11. The sliding member according to claim 1, wherein the back-metal layer comprises a porous metal portion on a surface which is the interface between the back-metal layer and the sliding layer.

12. A thrust bearing comprising a plurality of the sliding members according to claim 1.

* * * * *